United States Patent
Joo et al.

(10) Patent No.: US 8,852,804 B2
(45) Date of Patent: Oct. 7, 2014

(54) NEGATIVE ELECTRODE FOR LITHIUM ION SECONDARY BATTERY AND LITHIUM ION SECONDARY BATTERY INCLUDING THE SAME

(75) Inventors: Kyu-Nam Joo, Yongin-si (KR);
Beom-Kwon Kim, Yongin-si (KR);
Jong-Hee Lee, Yongin-si (KR);
Young-Su Kim, Yongin-si (KR);
Deok-Hyun Kim, Yongin-si (KR);
Gu-Hyun Chung, Yongin-si (KR);
So-Ra Lee, Yongin-si (KR); Jae-Myung Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 547 days.

(21) Appl. No.: 12/926,811

(22) Filed: Dec. 10, 2010

(65) Prior Publication Data
US 2011/0151322 A1   Jun. 23, 2011

(30) Foreign Application Priority Data
Dec. 21, 2009   (KR) .................. 10-2009-0128330

(51) Int. Cl.
*H01M 4/134*   (2010.01)
(52) U.S. Cl.
CPC ............ *H01M 4/134* (2013.01); *Y02E 60/122* (2013.01)
USPC ............ 429/220; 429/209; 429/223; 429/221
(58) Field of Classification Search
CPC .................................................. H01M 4/134
USPC .......... 429/220, 209, 223, 221, 218.1; 205/66
See application file for complete search history.

(56) References Cited

U.S. PATENT DOCUMENTS

| | | | | |
|---|---|---|---|---|
| 6,432,585 | B1 * | 8/2002 | Kawakami et al. | 429/233 |
| 7,455,931 | B2 * | 11/2008 | Yasuda et al. | 429/218.1 |
| 7,507,502 | B2 * | 3/2009 | Kojima et al. | 429/218.1 |
| 2005/0118507 | A1 | 6/2005 | Guterman et al. | |
| 2005/0175900 | A1 | 8/2005 | Yasuda et al. | |
| 2007/0091477 | A1 | 4/2007 | Iwai et al. | |
| 2008/0213672 | A1 | 9/2008 | Skotheim et al. | |
| 2011/0123866 | A1 * | 5/2011 | Pan et al. | 429/221 |

FOREIGN PATENT DOCUMENTS

| | | |
|---|---|---|
| JP | 2004-139768 A | 5/2004 |
| JP | 2007-108523 A | 4/2007 |
| JP | 2007-172963 A | 7/2007 |
| KR | 10-1999-0085021 A | 12/1999 |
| KR | 10 2003-0014263 A | 2/2003 |
| KR | 10-2004-0104470 A | 12/2004 |
| KR | 10-2005-0052920 A | 6/2005 |

OTHER PUBLICATIONS

N. Tamura, et al. Study on the Anode Behavior of Sn and Sn-Cu alloy thin-film electrodes, Apr. 20, 2002, Journal of Power Sources 107, pp. 48-55.*
Machine translation of JP 2004-139768, published May 13, 2004.*

* cited by examiner

*Primary Examiner* — Milton I Cano
*Assistant Examiner* — Lilia V Nedialkova
(74) *Attorney, Agent, or Firm* — Lee & Morse, P.C.

(57) ABSTRACT

A negative electrode for a lithium ion secondary battery and a lithium ion secondary battery, the negative electrode including a multilayer film, the multilayer film having three or more layers on a metal base, wherein the multilayer film includes one or more porous layers.

16 Claims, 5 Drawing Sheets

FIG. 7

NEGATIVE ELECTRODE FOR LITHIUM ION SECONDARY BATTERY AND LITHIUM ION SECONDARY BATTERY INCLUDING THE SAME

BACKGROUND

1. Field

Embodiments relate to a negative electrode for a lithium ion secondary battery and a lithium ion secondary battery including the same.

2. Description of the Related Art

A lithium ion secondary battery is a secondary battery that operates under a principle that electricity is generated when lithium ions move between a positive electrode and a negative electrode. The lithium ion secondary battery may include the positive electrode, the negative electrode, an electrolyte, and a separator. From these forming materials, a positive electrode active material and a negative electrode active material have a structure that facilitates intercalation or deintercalation of ionic lithium into or from the active materials. Thus, charging and discharging of the lithium ion secondary battery may be completed by a reversible reaction.

Lithium ion batteries have been used in mobile information devices, e.g., mobile phones, personal digital assistants (PDAs), and laptop computers, and have expanded to use in automobiles. Also, due to the desire for a compact size, light weight, and high performance, high energy density may be required. Although advances in lithium ion batteries have been rapidly developed, new performance characteristics are desired. In lithium ion batteries, various carbon-based materials may be used for a negative electrode and complex oxides of lithium and other metals may be used for a positive electrode. However, such materials may not be enough to improve energy density and a lifetime cycle. Thus, use of, e.g., metals, alloys, oxides, emulsions, and nitrides, which may replace the carbon-based materials, have been considered.

SUMMARY

Embodiments are directed to a negative electrode for a lithium ion secondary battery and a lithium ion secondary battery including the same, which substantially overcome one or more of the problems due to the limitations and disadvantages of the related art.

It is a feature of an embodiment to provide a negative electrode for a lithium ion secondary battery having excellent cycle performance.

At least one of the above and other features and advantages may be realized by providing a negative electrode for a lithium ion secondary battery including a multilayer film, the multilayer film having three or more layers on a metal base, wherein the multilayer film includes one or more porous layers.

The one or more porous layers may have a density of about 3 g/cc or less.

The one or more porous layers may have a porosity of about 40% to about 70%.

The multilayer film may further include non-porous layers and the porous layers and non-porous layers are alternately disposed on the metal base.

The one or more porous layers may each have a thickness of about 1 µm to about 5 µm.

The multilayer film may have a thickness of about 5 µm to about 15 µm.

Each layer of the multilayer film may include metal containing particles, the metal containing particles of each layer being different from the other layers.

Each layer of the multilayer film may include at least one of tin (Sn), copper (Cu), nickel (Ni), iron (Fe), bismuth (Bi), and alloys thereof.

The multilayer film may have a metal base/first non-porous layer/porous layer/second non-porous layer structure, a metal base/first non-porous layer/first porous layer/second non-porous layer/second porous layer/third non-porous layer structure, or a metal base/first non-porous layer/first porous layer/second non-porous layer/second porous layer/third non-porous layer/third porous layer/fourth non-porous layer structure.

The multilayer film may include a first non-porous layer, the first non-porous layer including an alloy of Sn and Cu, a porous layer on the first non-porous layer, the porous layer including an alloy of Sn and Cu, and a second non-porous layer, the second non-porous layer including an alloy of Sn and Cu.

At least one of the above and other features and advantages may also be realized by providing a lithium ion secondary battery including a negative electrode, the negative electrode including a multilayer film, wherein the multilayer film includes three or more layers on a metal base and one or more porous layers.

The one or more porous layers may have a density of about 3 g/cc or less.

The one or more porous layers may have a porosity of about 40% to about 70%.

The multilayer film may further include non-porous layers and the porous layers and non-porous layers are alternately disposed on the metal base.

The one or more porous layers may each have a thickness of about 1 µm to about 5 µm.

The multilayer film may have a thickness of about 5 µm to about 15 µm.

Each layer of the multilayer film may include metal containing particles, the metal containing particles of each layer being different from the other layers.

Each layer of the multilayer film may include at least one of tin (Sn), copper (Cu), nickel (Ni), iron (Fe), bismuth (Bi), and alloys thereof.

The multilayer film may have a metal base/first non-porous layer/porous layer/second non-porous layer structure, a metal base/first non-porous layer/first porous layer/second non-porous layer/second porous layer/third non-porous layer structure, or a metal base/first non-porous layer/first porous layer/second non-porous layer/second porous layer/third non-porous layer/third porous layer/fourth non-porous layer structure.

The multilayer film may include a first non-porous layer, the first non-porous layer including an alloy of Sn and Cu, a porous layer on the first non-porous layer, the porous layer including an alloy of Sn and Cu, and a second non-porous layer, the second non-porous layer including an alloy of Sn and Cu.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0128330, filed on Dec. 21, 2009, in the Korean Intellectual Property Office, and entitled: "Negative Electrode for Lithium Ion Secondary Battery and Lithium Ion Secondary Battery Comprising the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Carbon-based materials in batteries have nearly reached a theoretical capacity and new discharge capacity is barely improved. Accordingly, development of tin (Sn)-based or silicon (Si)-based materials has attracted attention. However, cubical expansion may be significant in these materials when lithium ions are occluded. Cubic volume of carbon-based materials may expand by about 1.5 times, whereas cubic volumes of the Sn-based materials and Si-based materials may expand by about 3.5 times and 4 times, respectively. Accordingly, active materials may be finely powdered to avoid being separated from a current collector, e.g., a Cu thin film, during a charging/discharging cycle. However, characteristics of these materials may be significantly deteriorated and thus may be difficult to use.

The Sn-based or Si-based materials may be finely powdered; and a mixture of the finely powdered Sn-based or Si-based materials and a conductive binder may be coated on a current collector so that cubical expansion due to reaction with lithium may be reduced and a cycle performance may be improved.

However, when finely powdered Sn or a Sn alloy is used as an active material in order to reduce cubical expansion and to improve cycle performance, mechanical alloying, gas atomizing, and/or melt spinning may be required to form the fine particles. Thus, manufacturing process costs may significantly increase.

A metal compound manufactured as described above may have low electric conductivity and high resistance to lithium intercalation and deintercalation such that charging and discharging may be difficult.

In this regard, Sn or a Sn compound may be formed on the electrode by, e.g., plating. A tin (Sn) film or a tin (Sn) alloy film may be formed on both surfaces of a current collector by using Sn or a Sn alloy plating solution. In this case, the Sn film may be formed of a film on which plating particles having a particle size of about 0.5 μm are coated.

A Sn thin film may be formed on a Cu thin film; and the Cu thin film having the Sn thin film thereon may be thermally treated, thereby obtaining a layered structure in which Cu atoms and Sn atoms are inter-diffused at a Cu—Sn interface. Due to interdiffusion at the Cu—Sn interface, a Cu—Sn alloy having, e.g., a $Cu/Cu_4Sn/Cu_6Sn_5/Sn$ structure or a crystal structure similar to the $Cu/Cu_4Sn/Cu_6Sn_5/Sn$ structure may be formed. $Cu_6Sn_5$ may allow Li to reversibly occlude or release. In addition, cubical change, i.e., expansion, of $Cu_6Sn_5$ may be less than that of Sn alone. Furthermore, $Cu_6Sn_5$ may not function as a catalyst. Thus, $Cu_6Sn_5$ may be a negative electrode material that represents advances over Si and Sn.

Thus, if a thin film electrode is formed using electroplating, a current collector (negative electrode Cu substrate) and an active material may be closely adhered to each other. Accordingly, if the active material is finely powdered, the active material may be prevented from being separated from the Cu substrate (current collector), thereby improving cycle performance.

However, if close adhesion between the current collector and the active material increases, the entire electrode may be affected by a cubical change, i.e., expansion, of an active material thin film due to Li occlusion and release so that electrode expansion, wrinkles on the current collector, and/or cracking in the thin film of the current collector may occur to a significant degree. Accordingly, electrical conductivity of the electrode may decrease, thereby reducing cycle performance. Also, a Sn metal compound may be hard and thus may be easily breakable due to stress. Accordingly, cracking may easily occur.

According to an embodiment, a negative electrode for a lithium ion secondary battery may include a multilayer film formed of, e.g., three or more layers on a metal base. The multilayer film may include one or more porous layer. A porous layer may be defined as a layer having pores and may have a porosity of, e.g., greater than about 40%.

A base for a negative electrode may be formed by plating, e.g., Sn or an alloy of Sn and, e.g., Bi, Cu, Al, Fe, Zn, and/or In, on a Cu substrate, thereby forming a $Cu/Cu_3Sn/Cu_6Sn_5/Sn$ layer as a plating film. In an implementation, $Cu_6Sn_5$ may be formed as the base.

Figure 1:
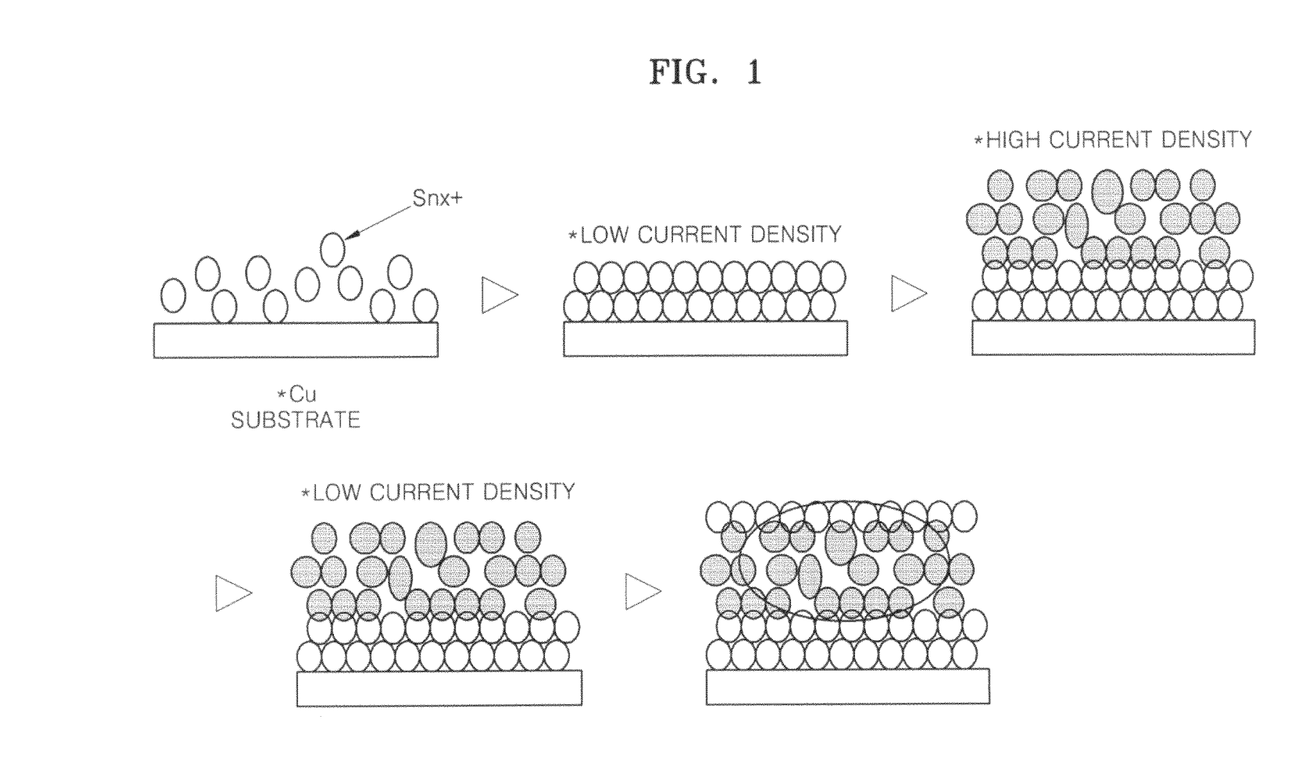
FIG. 1 schematically illustrates formation of a multilayer film according to an embodiment.

FIG. 1 schematically illustrates formation of a multilayer film according to an embodiment. (In FIG. 1, x denotes other metals, e.g., Cu, Zn, and Fe, and thus Snx may be an alloy of Sn and the other metals, e.g., Sn—Cu, Sn—Zn, or Sn—Fe)

Referring to FIG. 1, a first, non-porous layer may be coated on a copper (Cu) substrate, i.e., a metal base, at a low current density. A second, porous layer may then be coated on the first layer at a high current density. Then, a third, non-porous layer may be coated on the second layer at a low current density, thereby forming a multilayer film. A non-porous layer may be defined as a layer having no pores of significantly small pores.

Figure 3:
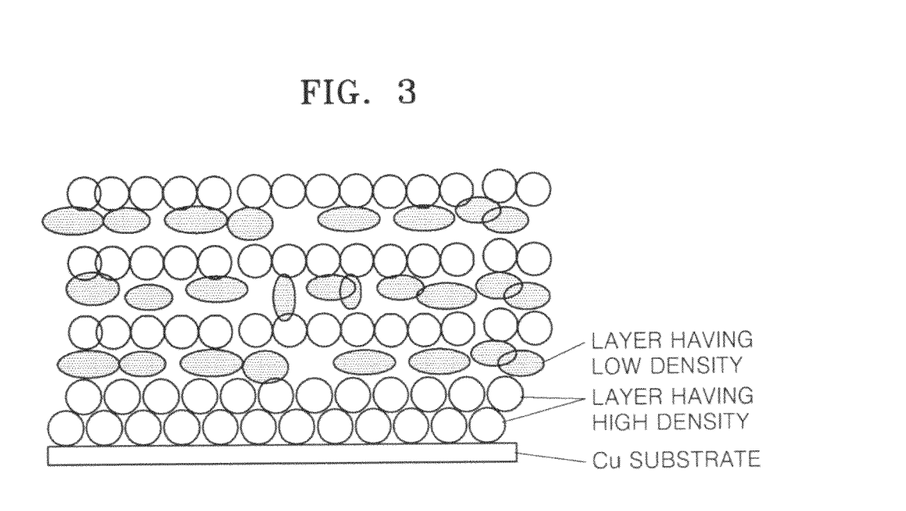
FIG. 3 schematically illustrates a seven-layered multilayer film according to an embodiment.

FIG. 3 schematically illustrates a seven-layered multilayer film according to an embodiment.

The multilayer film of FIG. 3 may be formed by repeating the processes of forming the multilayer film of FIG. 1.

If a thin film is formed by electroplating Sn or a Sn alloy on a substrate for a negative electrode, sizes of Sn particles may be different from each other in each layer. Thus, a layered structure having a uniform porosity in the same layer and having different porosities in each different layer may be formed. For example, in the multilayer film, sizes of the particles may be small in the first layer, whereas sizes of the particles may be relatively large in the second layer. In this regard, layers each having different particle sizes may be formed.

Porosity of a Sn film, e.g., a particle layer, may be controlled. Since a specific surface area may increase with the porosity, expansion during charging/discharging may be prevented. In other words, a layer having a higher porosity may accommodate expansion of particles from layers having lower porosity.

In such a structure, a rate of formation of Sn particles may be changed by changing, e.g., Sn concentration, temperature, and current density during plating. Thus, particle sizes of components of the layers, and in turn, porosity thereof, may vary according to the rate of formation of the particles.

The metal base may be a metal that does not alloy with Li. In an implementation, the metal base may include, e.g., iron (Fe), copper (Cu), nickel (Ni), tin (Sn), indium (In), antimony (Sb), zirconium (Zr), silicon (Si), and/or alloys thereof, provided that the metal base does not have a characteristic of a current collector. A thickness of the metal base may be, e.g., about 5 to about 30 μm.

The porous layer may have a density of about 3 g/cc or less. In an implementation, the density may be, e.g., about 1 to about 3 g/cc.

Maintaining the density of the porous layer at about 3 g/cc or less may help ensure that a significant deterioration in charging/discharging cycle performance due to expansion may not occur. Thus, cracks and a breakage of the active materials due to cubical expansion may not occur.

Porosity of the porous layer may be about 40 to about 70%.

Maintaining the porosity of the porous layer at about 40 to about 70%. may help ensure sufficient space for the active materials to expand with respect to a volume change, thus maintaining a lifetime characteristic and an initial characteristic. Typically, the active materials may be broken in a confined container or space due to expansion. However, in the electrode including at least one porous layer according to an embodiment, if expansion occurs, a sufficient space for accommodating the expansion may exist. Thus, breakage may be prevented, thereby securing an excellent lifetime characteristic. In addition, such porosity may provide a smooth path for lithium ion during charging/discharging.

The multilayer film may be formed by, e.g., alternately stacking the porous layers and the non-porous layers. For example, the multilayer film may have a metal base/first non-porous layer/porous layer/second non-porous layer structure, a metal base/first non-porous layer/first porous layer/second non-porous layer/second porous layer structure, a metal base/first non-porous layer/first porous layer/second non-porous layer/second porous layer/third non-porous layer structure, or a metal base/first non-porous layer/first porous layer/second non-porous layer/second porous layer/third non-porous layer/third porous layer/fourth non-porous layer.

A thickness of the porous layer may be about 1 to about 5 μm.

In order to reduce density, reduce particle size, and increase porosity, plating may be performed for a short period of time and, thus, a plating thickness of the porous layer may be within the above range.

A thickness of the entire multilayer film may be about 5 to about 15 μm.

Such a thickness may be sufficient to ensure that the electrode including the copper current collector may be rolled.

Each layer of the multilayer film may include, e.g., tin (Sn), copper (Cu), nickel (Ni), iron (Fe), bismuth (Bi), and/or alloys thereof.

The multilayer film may have a structure of Cu metal base/non-porous layer including, e.g., an alloy of Sn and Cu/porous layer including, e.g., an alloy of Sn and Cu/non-porous layer including, e.g., an alloy of Sn and Cu.

In consideration of a thickness and a material of each layer of the multilayer film, the multilayer film may have a structure of Cu metal base/non-porous layer including, e.g., an alloy of Sn and Cu having a thickness of about 1 to about 5 μm/porous layer including, e.g., an alloy of Sn and Cu having a thickness of about 2 to about 4 μm/non-porous layer including, e.g., an alloy of Sn and Cu having a thickness of about 1 to about 4 μm.

Plating may include Sn plating or electroplating of an alloy including at least one of Cu, Bi, Fe, and Ni. During forming the plated layers, temperature of a plating solution, plating time, and current density may be changed. Thus, a layered structure in which each layer has different particle sizes may be provided.

The plating solution may include a tin sulfate plating solution in which $SnSO_4$ is dissolved in, e.g., a sulfuric bath. Sulfuric acid, gelatin beta-naphthol formalin, or cresol sulfonic acid may be added to the plating solution. Also, for smooth plating, other additives may be used. In an implementation, e.g., a stannous fluoroborate solution ($Sn(BF_4)_2$) or sodium stannate may be used as a plating solution.

$SnSO_4$ and $CuSO_4.5H_2O$ may be used in SnCu alloy plating. Also, alloy plating is possible if a nitrate of, e.g., nickel (Ni), iron (Fe), bismuth (Bi), or indium (In), or a sulfate of, e.g., nickel (Ni), iron (Fe), bismuth (Bi), or indium (In), is added to the Sn plating solution. The plating solution may further include various suitable additives and dispersing agents.

The plating solution may be stirred; and a temperature of the plating solution may be, e.g., about 30 to about 60° C., or any temperature suitable for typical plating techniques.

The stirred solution may be sprayed through a pump; and a time for forming a plated layer may be controlled according to spraying strength. Due to strong stirring, a high current density may be applied; and plating time may be reduced.

Time for plating may be controlled according to a desired layer thickness and may generally be about 10 minutes.

Current density may be about 0.5 to about 40 $mA/dm^2$. In an implementation, the current density may be about 15 to about 30 $mA/dm^2$ for forming crude particles.

The above conditions may be varied according to a state of the plating solution, and thus, properties of layers may be controlled according to plating time, current density, temperature, and amount of stirring.

After the plated layer is formed, a Sn intermetallic compound may be formed by diffusion and heat diffusion. Such a layer may be manufactured as an active material and the intermetallic compound may have a layered structure including layers each having different particle sizes. After the plating, the intermetallic compound may be formed by being heated under a non-oxidizing atmosphere.

The porous layers having fine pores in the multilayer film may reduce a cubic change, i.e., expansion, during cycle performance, i.e., charging/discharging.

Also, in the layered structure, a first layer coated on the metal base, i.e., the Cu substrate, may be formed of smaller particles than particles of a second layer. Thus, the first layer may be strongly adhered to the metal base, i.e., the current collector, by heat diffusion so that separation between the current collector and the active material due to expansion may be prevented.

A lithium ion secondary battery including the negative electrode for a lithium ion secondary battery according to an embodiment may be manufactured as follows.

First, a positive electrode active material, a conducting agent, a binder, and a solvent may be mixed to prepare a positive electrode active material composition. The positive electrode active material composition may be directly coated on an aluminum current collector and dried to prepare a positive electrode. In an alternative implementation, the positive electrode active material composition may be cast on a separate support and then a positive electrode active material film may be separated from the support and may be laminated on the aluminum current collector to prepare a positive electrode.

The positive electrode active material may be any suitable lithium-containing metal oxide. The positive electrode active material may include, e.g., $LiCoO_2$, $LiMn_xO_{2x}$, $LiNi_{x-1}Mn_xO_{2x}$ where x=1 or 2, and/or $Ni_{1-x-y}Co_xMn_yO_2$ where $0 \leq x \leq 0.5$ and $0 \leq y \leq 0.5$.

The conductive material may include, e.g., carbon black. The binder may include, e.g., a vinylidenefluoride/hexafluoropropylene copolymer, polyvinylidenefluoride, polyacrylonitrile, polymethylmethacrylate, polytetrafluoroethylene, or a mixture thereof, or a styrene butadiene rubber-based polymer. The solvent may include, e.g., N-methylpyrrolidone, acetone, water, etc. An amount of the positive electrode active material, the conductive material, the binder, and the solvent used may correspond to suitable amounts typically used in forming a lithium battery.

A multilayer film may be formed on the current collector to prepare a negative electrode plate. The negative electrode active material may include, e.g., tin (Sn), copper (Cu), nickel (Ni), iron (Fe), bismuth (Bi), and alloys thereof.

Any suitable separator for use in lithium batteries may be used. Specifically, the separator may have a low resistance to ion mobility and excellent electrolytic solution retaining properties. The separator may include, e.g., glass fiber, polyester, Teflon (polytetrafluoroethylene PTFE), polyethylene, polypropylene, and/or combinations thereof. Each of the separator materials may be in the form of, e.g., a nonwoven fabric or a woven fabric. In particular, a lithium ion battery may use a foldable separator formed of, e.g., polyethylene or polypropylene, and a lithium ion polymer battery may use a separator having, e.g., an excellent organic electrolytic solution retaining capability. A method of preparing these separators will now be described in detail.

A polymer resin, a filler, and a solvent may be mixed to prepare a separator composition. The separator composition may be directly coated on an electrode and then dried to form a separator film. In an alternative implementation, the separator composition may be cast on a support and then dried to form a separator composition film. The separator composition film may then be separated from the support and laminated on an electrode to form a separator.

The polymer resin may include any suitable material used as a binder for an electrode plate. In an implementation, the polymer resin may include, e.g., a vinylidenefluoride/hexafluoropropylene copolymer, polyvinylidenefluoride, polyacrylonitrile, polymethylmethacrylate, and mixtures thereof. In another implementation, the polymer resin may include, e.g., a vinylidene fluoride/hexafluoropropylene copolymer in which the hexafluoropropylene may be included in an amount of about 8 to about 25 parts by weight.

The separator may be interposed between the positive electrode and the negative electrode to form a battery assembly. The battery assembly may be wound or folded and may then be encased in a cylindrical battery case or a square battery case. An organic electrolyte solution may then be injected into the battery case to complete a lithium ion battery. In an alternative implementation, the battery assembly may be laminated to form a bi-cell structure and impregnated with an organic electrolyte solution. The resultant structure may be encased in a pouch and sealed to complete a lithium ion polymer battery.

The organic electrolytic solution may include a lithium salt and a mixed organic electrolytic solution formed of, e.g., a high dielectric constant solvent and a low boiling point solvent. If desired, the organic electrolytic solution may further include various additives, e.g., an overcharge protecting agent.

The high dielectric constant solvent used in the organic electrolytic solution is not particularly limited and may include, e.g., γ-butyrolactone and/or a cyclic carbonate such as ethylene carbonate, propylene carbonate, or butylene carbonate.

The low-boiling point solvent is also not particularly limited. In an implementation, the low-boiling point solvent may include, e.g., chain type carbonates such as dimethyl carbonate, ethylmethyl carbonate, diethyl carbonate, or dipropyl carbonate, dimethoxyethane, diethoxyethane, and aliphatic ester derivatives.

At least one hydrogen atom in each of the high dielectric solvent and the low boiling point solvent may be substituted with a halogen atom, e.g., a fluorine atom. However, the halogen atom is not limited thereto.

A mixture ratio of the high dielectric constant solvent to the low boiling point solvent may be about 1:1 to about 1:9. Maintaining the mixture ratio at about 1:1 to about 1:9 may help ensure that discharge capacity and charging/discharging lifetime are not reduced.

The lithium salt used in the organic electrolytic solution may include any suitable lithium salt typically used in lithium batteries. The lithium salt may include, e.g., $LiClO_4$, $LiCF_3SO_2$, $LiPF_6$, $LiN(CF_3SO_2)_2$, $LiBF_4$, $LiC(CF_3SO_2)_3$, and/or $LiN(C_2F_5SO_2)_2$.

In the organic electrolyte, a concentration of the lithium salt may be about 0.5 to about 2 M. Maintaining the concentration of the lithium salt at about 0.5 M or greater may help ensure that conductivity of the organic electrolyte is not decreased, thereby maintaining performance of the organic electrolyte. Maintaining the concentration of the lithium salt at about 2.0 M or less may help ensure that viscosity of the organic electrolyte is not increased and mobility of lithium ions is not degraded.

The embodiments will now be described with reference to the following examples. These examples are presented for illustrative purposes only and are not intended to limit the scope of the embodiments.

EXAMPLES

Example 1

3-layered Multilayer Film

1) Forming a First Layer

1 L of a plating solution prepared by adding 150 g of tin sulfate, 20 g of copper sulfate, 200 g of sulfuric acid, and water was used.

The plating solution was coated on a Cu substrate having a thickness of about 15 μm at current density of about 5 mA/dm$^2$ and at 40° C. for about 120 seconds to form a dense, i.e., non-porous, layer.

Density of the non-porous layer was measured using a thickness, weight, and area of a plated layer. The density was 6.99 g/cc.

Density of a plating sample was calculated by plating weight/(thickness of plated layer x area of sample). The plating weight was 0.00035 g, the thickness of the plated layer was 5 μm, and the area of the sample was 1 cm$^2$ (unit).

The porosity of the non-porous layer was measured by a weighing method using a general porosimeter, and was about 0.5%.

A thickness of the non-porous layer was measured using a general micrometer, and was 4 μm.

2) Forming a Second Layer

The same plating solution described above was coated on the first layer for about 5 seconds at a current density of about 20 mA/dm$^2$ and at 40° C. to form a layer having a thickness of about 1.5 μm.

Density of the second layer was 3 g/cc.

Porosity of the second layer was measured in the same manner as in the first layer and was 63%.

3) Forming a Third Layer

A third layer was formed in the same manner as in the first layer, and a thickness, density, and porosity of the third layer were 3 μm, 6 g/cc, and 6%, respectively.

Accordingly, a negative electrode for a lithium ion secondary battery having a Cu base metal/non-porous layer (first layer)/porous layer (second layer)/non-porous layer (third layer) structure was manufactured.

Example 2

4-layered Multilayer Film

A fourth layer was formed on the multilayer film of Example 1 in the same manner as in forming the second layer of Example 1. Thus, a negative electrode for a lithium ion secondary battery having a Cu base metal/first non-porous layer (first layer)/first porous layer (second layer)/second non-porous layer (third layer)/second porous layer (fourth layer) structure was manufactured.

A thickness, density, and porosity of the fourth layer were 3 μm, 3 g/cc, and 60%, respectively.

Example 3

5-layered Multilayer Film

A fifth layer was formed on the multilayer film of Example 2 in the same manner as in forming the first layer of Example 1. Thus, a negative electrode for a lithium ion secondary battery having a Cu base metal/first non-porous layer (first layer)/first porous layer (second layer)/second non-porous layer (third layer)/second porous layer (fourth layer)/third non-porous layer (fifth layer) structure was manufactured.

A thickness, density, and porosity of the fifth layer were 3 μm, 6 g/cc, and 6%, respectively.

Figure 2:
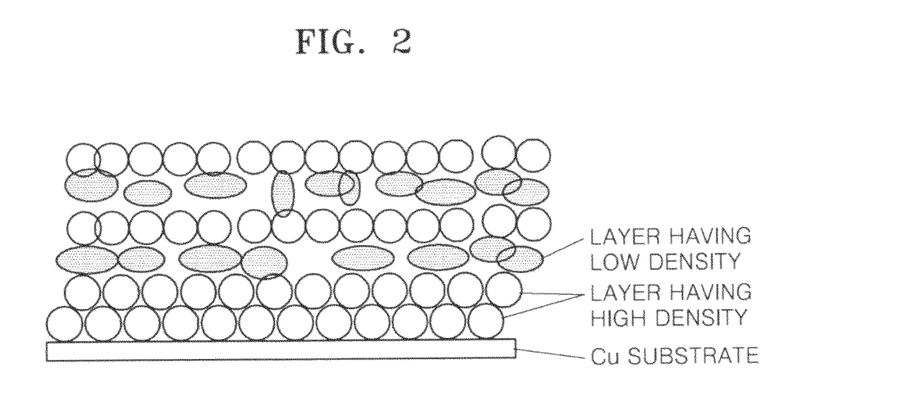
FIG. 2 schematically illustrates a five-layered multilayer film according to an embodiment.

FIG. 2 schematically illustrates a five-layered multilayer film according to an embodiment.

Referring to FIG. 2, non-porous layers and porous layers may be alternately formed on the Cu substrate.

Figure 4:
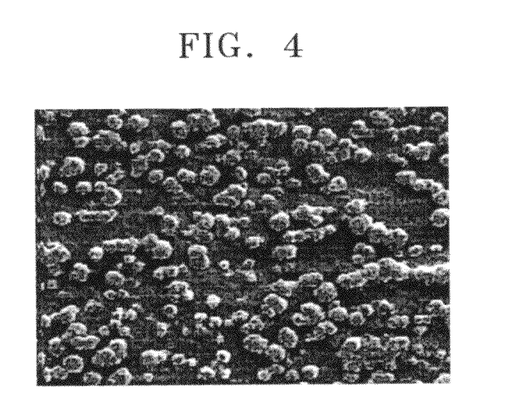
FIG. 4 illustrates a scanning electron microscopic (SEM) image of a porous layer of a multilayer film according to an embodiment.

FIG. 4 illustrates a scanning electron microscopic (SEM) image of the porous layer of the multilayer film according to an embodiment (magnification of 5000 times).

Sizes and densities of particles may be reduced so that a total number of particles on a surface of the porous layer may be reduced. Accordingly, small-sized particles may not be densely formed, but rather sparsely formed.

Figure 5:
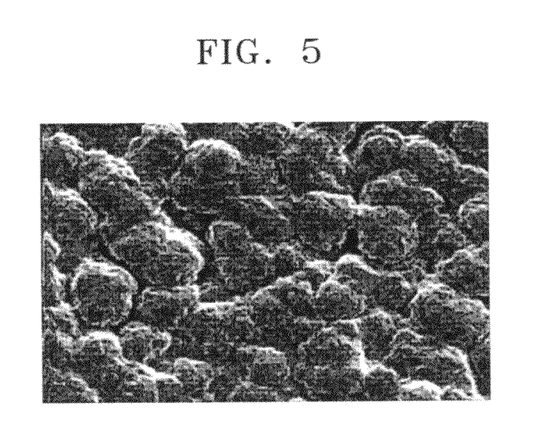
FIG. 5 illustrates a SEM image of a non-porous layer of a multilayer film according to an embodiment.

FIG. 5 illustrates a SEM image of the non-porous layer of the multilayer film according to an embodiment (magnification of 5000 times).

Comparing FIG. 4 and FIG. 5, particle sizes may be relatively smaller and pores between the particles may be larger in the porous layer compared to those of the non-porous layer.

Comparative Example 1

A copper foil was used as a current collector and a plating solution was the same as the plating solution used in Example 1. 50 ml of a tin additive (HT-31 manufactured by Hojin) was added to 1 L of the plating solution.

The plating solution prepared as described above was used to form a plated layer having a thickness of about 10 μm on the Cu substrate at current density of 3 mA/dm$^2$ and at 40° C.

Experimental Example 1

Cycle Performance Test

The electrodes obtained in Example 3 and Comparative Example 1 were used as negative electrodes and Li was used to form positive electrodes to thereby prepare 2016-type coin cells. Charging/discharging cycle tests were performed between about 1.5 and about 0 V on each of the cells.

A mixed solution of ethylene carbonate (EC), in which 1.3 M of LiPF$_6$ was dissolved, diethylene carbonate (DEC), and fluoro ethylene carbonate (FEC) (volume ratio of 2:6:2) was used as an electrolyte. Each of the cells was charged until the voltage of the Li electrode reached 0.001 V with a constant current of 100 mA per 1 g of the active material. Then, each of the cells was charged at a constant voltage of 0.001 V until a current reduced to 10 mA per 1 g of the active material. The charged cells were allowed to stand for about 10 minutes and then discharged under a constant current of 100 mA per 1 g of the active material until the voltage reached to 1.5 V. The results are shown in Table 1.

TABLE 1

| | Initial discharge capacity (mAh/g) | Initial efficiency | Capacity retention rate (%) after 50 cycles |
|---|---|---|---|
| Example 4 (negative electrode of Example 3) | 600 | 95 | 90 |
| Example 2 (negative electrode of Comparative Example 1) | 500 | 98 | 70 |

According to the results shown in Table 1, initial capacity of the cell of Example 4 was greater that that of Comparative Example 2.

Figure 6:
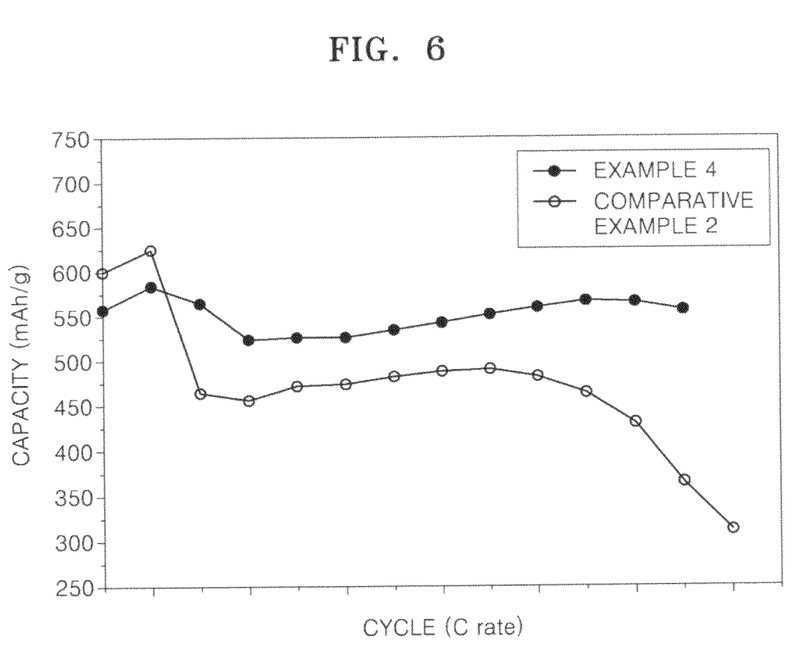
FIG. 6 illustrates a graph of results obtained by measuring cycle performances of lithium secondary batteries of Example 4 and Comparative Example 2.
Figure 7:
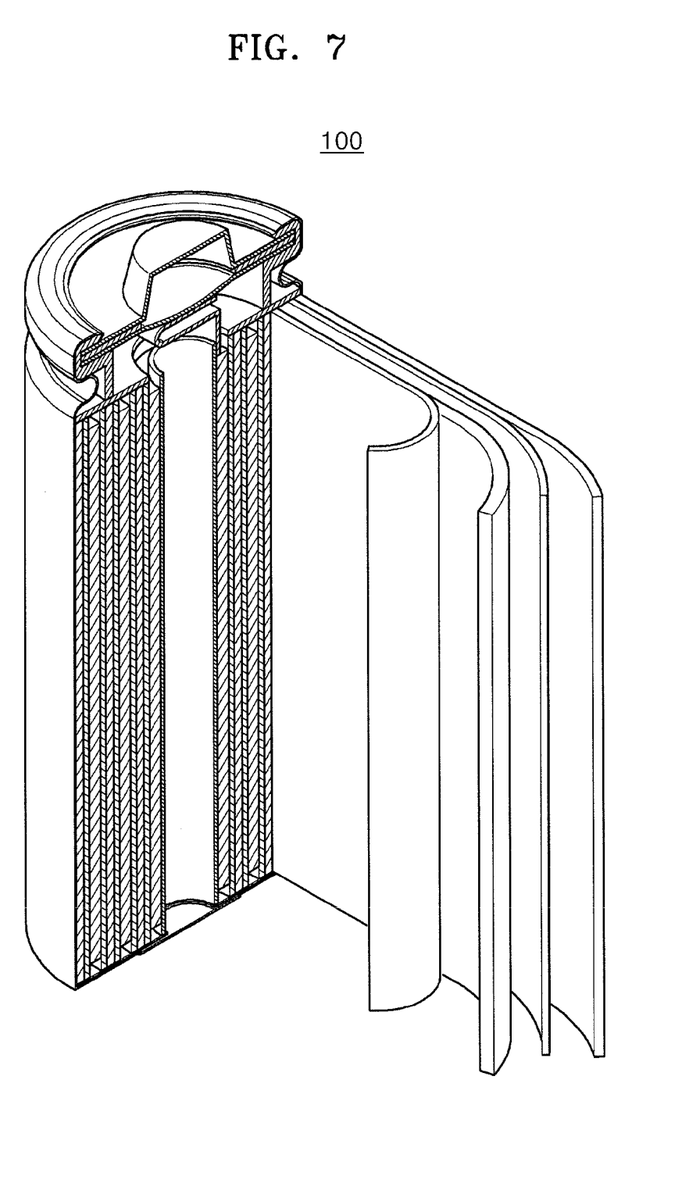
FIG. 7 illustrates a lithium ion secondary battery 100 according to an embodiment.

FIG. 6 illustrates a graph of a result obtained by measuring cycle performances of the lithium secondary batteries of Example 4 and Comparative Example 2.

Referring to FIG. 6, cycle performance was excellent in Example 4, compared with Comparative Example 2. In Comparative Example 2, the plated layer separated from the current collector due to cubical expansion. Thus, lifetime of the lithium secondary battery was reduced.

As described above, in the lithium ion secondary battery including the negative electrode according to an embodiment, deterioration of cycle performance due to charging/discharging may be prevented.

The deterioration of the cycle performance may be caused by expansion and contraction of the negative electrode active material layer due to reaction with lithium. Such expansion and contraction may cause conductivity of a metal compound of Sn and Cu to be deteriorated.

The porous layers of the negative electrode for the lithium ion secondary battery according to an embodiment may support with, i.e., may accommodate, the expansion and contraction and, thus, the cycle performance of the lithium ion secondary battery including the negative electrode for the lithium ion secondary battery may be excellent.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A negative electrode for a lithium ion secondary battery, comprising:
   a multilayer film on a metal base, wherein the multilayer film includes
   a first non-porous layer on the metal base,
   a first porous layer on the first non-porous layer,
   a second non-porous layer on the first porous layer, the second non-porous layer including an alloy of Sn and Cu,
   a second porous layer on the second non-porous layer, and
   a third non-porous layer on the second porous layer,
   wherein each layer of the multilayer film includes metal containing particles, the metal containing particles of each layer being different from metal containing particles of the other layers.

2. The negative electrode as claimed in claim 1, wherein at least one of the porous layers has a density of about 3 g/cc or less.

3. The negative electrode as claimed in claim 1, wherein at least one of the porous layers has a porosity of about 40% to about 70%.

4. The negative electrode as claimed in claim 1, wherein the porous layers each have a thickness of about 1 µm to about 5 µm.

5. The negative electrode as claimed in claim 1, wherein the multilayer film has a thickness of about 5 µm to about 15 µm.

6. The negative electrode as claimed in claim 1, wherein each layer of the multilayer film includes at least one of tin (Sn), copper (Cu), nickel (Ni), iron (Fe), bismuth (Bi), and alloys thereof.

7. The negative electrode as claimed in claim 1, wherein
   the first non-porous layer includes an alloy of Sn and Cu, and
   the first porous layer includes an alloy of Sn and Cu.

8. The negative electrode as claimed in claim 1, wherein the multilayer film further includes:
   a third porous layer on the third non-porous layer, and
   a fourth non-porous layer on the third porous layer.

9. A lithium ion secondary battery, comprising:
   a negative electrode, the negative electrode including a multilayer film on a metal base, wherein the multilayer film includes:
   a first non-porous layer on the metal base,
   a first porous layer on the first non-porous layer,
   a second non-porous layer on the first porous layer, the second non-porous layer including an alloy of Sn and Cu,
   a second porous layer on the second non-porous layer, and
   a third non-porous layer on the second porous layer,
   wherein each layer of the multilayer film includes metal containing particles, the metal containing particles of each layer being different from metal containing particles of the other layers.

10. The lithium ion secondary battery as claimed in claim 9, wherein at least one of the porous layers has a density of about 3 g/cc or less.

11. The lithium ion secondary battery as claimed in claim 9, wherein at least one of the porous layers has a porosity of about 40% to about 70%.

12. The lithium ion secondary battery as claimed in claim 9, wherein the porous layers each have a thickness of about 1 µm to about 5 µm.

13. The lithium ion secondary battery as claimed in claim 9, wherein the multilayer film has a thickness of about 5 µm to about 15 µm.

14. The lithium ion secondary battery as claimed in claim 9, wherein each layer of the multilayer film includes at least one of tin (Sn), copper (Cu), nickel (Ni), iron (Fe), bismuth (Bi), and alloys thereof.

15. The lithium ion secondary battery as claimed in claim 9, wherein:
   the first non-porous layer includes an alloy of Sn and Cu, and
   the first porous layer includes an alloy of Sn and Cu.

16. The lithium ion secondary battery as claimed in claim 9, wherein the multilayer film further includes:
   a third porous layer on the third non-porous layer, and
   a fourth non-porous layer on the third porous layer.

* * * * *